Feb. 25, 1936.  J. F. KOVALSKY  2,032,176
CONTROL SYSTEM
Filed April 12, 1932  2 Sheets-Sheet 1

WITNESSES:
E. A. McClesky
George A. Noodling

INVENTOR
Joseph F. Kovalsky.
BY
W. R. Coley
ATTORNEY

Feb. 25, 1936.     J. F. KOVALSKY     2,032,176
CONTROL SYSTEM
Filed April 12, 1932     2 Sheets-Sheet 2

WITNESSES:
E. A. M?Claskey.
George V. Woodling

INVENTOR
Joseph F. Kovalsky.
BY W. R. Coley
ATTORNEY

Patented Feb. 25, 1936

2,032,176

UNITED STATES PATENT OFFICE 2,032,176

CONTROL SYSTEM

Joseph F. Kovalsky, Turtle Creek, Pa., assignor to Westinghouse Electric & Manufacturing Company, a corporation of Pennsylvania Application April 12, 1932, Serial No. 604,699

1 Claim. (Cl. 172—239)

My invention relates generally to control systems and more particularly to control systems that may be utilized for operating electric motors.

An object of my invention is the provision of a control system of the class indicated that shall be simple and reliable in operation and be readily and economically manufactured and installed.

Another object of my invention is to provide for regulating the amount of current passing between the anode and the cathode of a grid-glow tube by utilizing an improved form of bridge phase-shifting circuit.

It is also an object of my invention to provide for automatically and gradually accelerating an electric motor from rest to any predetermined selected speed.

A further object of my invention is to provide for varying the rate of acceleration of an electric motor.

A still further object of my invention is to provide for momentarily giving a relatively high starting torque.

Figure 1:
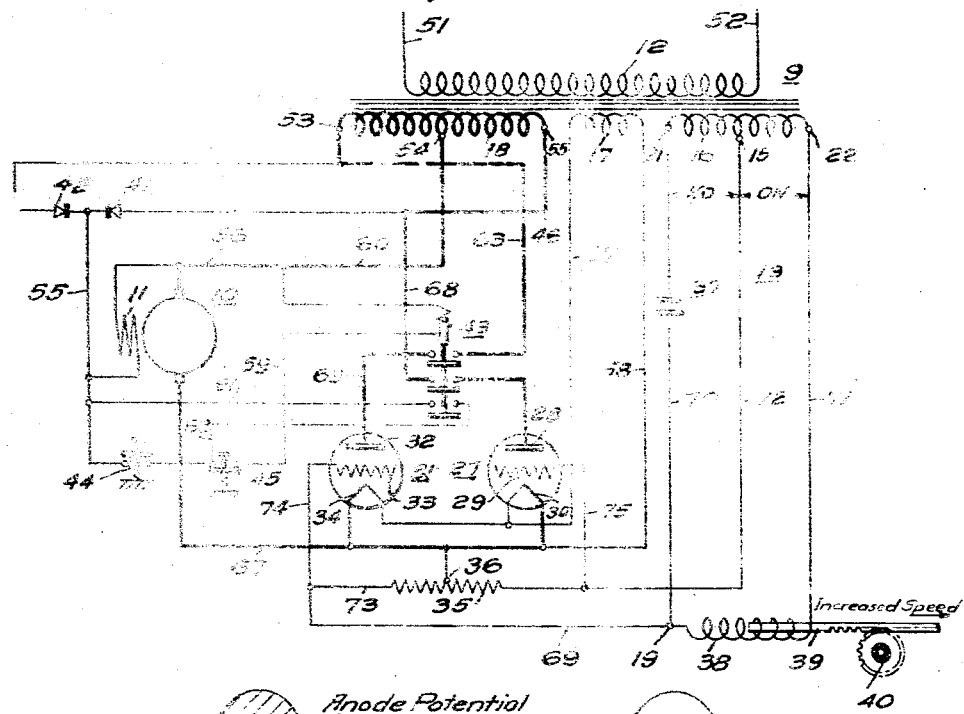
Figure 2:
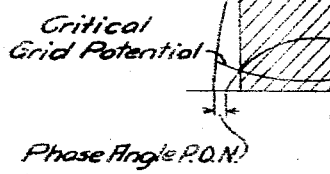

Further objects and a fuller understanding of my invention may be had by referring to the following description taken in connection with the accompanying drawings, in which:

Figure 1 is a diagrammatic view of a control system embodying the features of my invention, Fig. 2 is a graphical representation of the electrical characteristics of a power grid-glow tube in which the shaded portion indicates the quantity of current flowing between the anode and the cathode at a definite phase angle between the potential of the anode and the grid.

Figure 3:
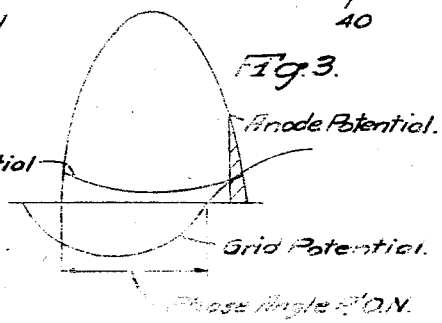
Figure 4:
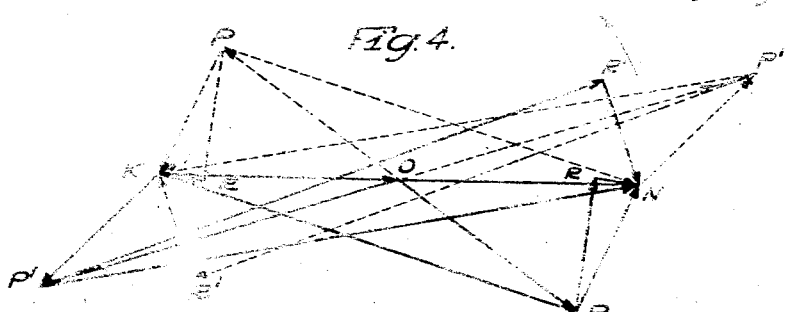

Fig. 3 is a similar graphical representation of the electrical characteristics of a power grid-glow tube in which the relatively small shaded portion represents the quantity of current flowing between the anode and the cathode at a larger phase angle than that shown in Fig. 2, Fig. 4 is a vector representation of the phase angle and magnitude of the grid potential of a power grid-glow tube with respect to its anode potential.

Figure 5:
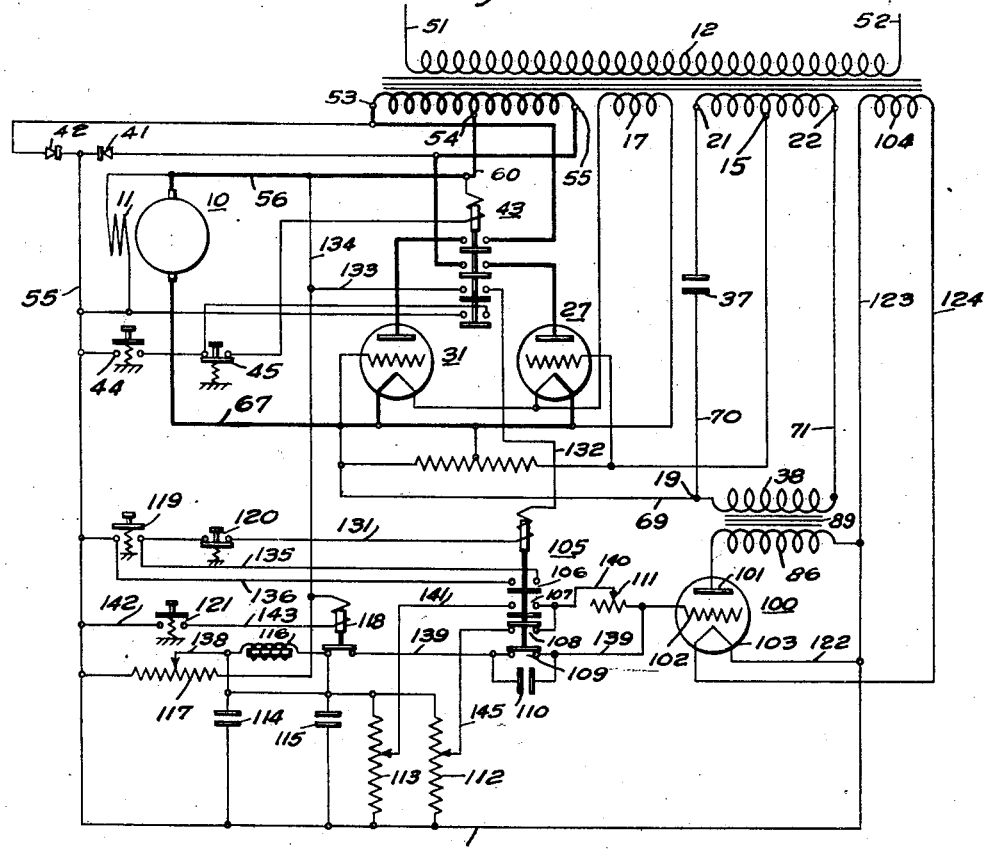
Figure 6:
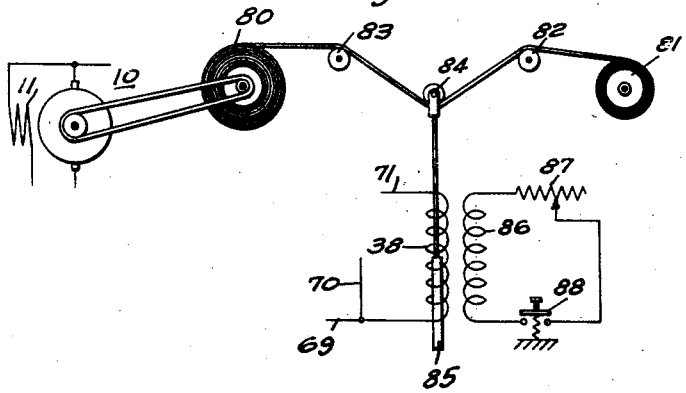

Fig. 5 is a diagrammatic view of a control system embodying a modified form of my invention wherein means are provided for automatically and gradually accelerating the motor from rest to any predetermined selected speed, and Fig. 6 is a diagrammatic view showing a part only of the bridge phase-shifting circuit shown in Fig. 1, together with means for operating the phase shifting circuit in accordance with the tension of material as it is being wound upon a reel.

With particular reference to Fig. 1, my invention comprises, in general, a motor 10 having a field winding 11, a transformer 9 having a primary winding 12, and a plurality of secondary windings 16, 17 and 18, a pair of asymmetric units 41 and 42 for supplying unidirectional current to the field winding 11, two power grid-glow tubes 27 and 31, a relay 43 for connecting the power grid-glow tubes 27 and 31 in circuit relation with the armature of the motor 10 and the secondary winding 18, a set of push buttons 44 and 45 for operating the relay 43, and a bridge phase-shifting circuit 13 for shifting the phase of the grid potential of the power grid-glow tubes 27 and 31 relatively to their anode potentials.

The field winding 11 of the motor 10 is disposed to be energized with unidirectional current provided by the pair of asymmetric units 41 and 42 which are connected across the terminals 53 and 55 of the secondary transformer winding 18. By utilizing a pair of asymmetric units, double-wave rectification is obtained for energizing the field winding 11.

The transformer 9 may be of any well known type having a plurality of secondary windings. The winding 18 having a mid-tap 54 is arranged to be connected in circuit relation with the armature of the motor 10 and the power grid-glow tubes 27 and 31 by means of the relay 43. The secondary transformer winding 17 provides energization for electrically heating the cathodes 30 and 34 of the power grid-glow tubes. The secondary winding 16 having a mid-tap 15 comprises a part of the bridge phase-shifting circuit 13 for varying the phase relation and the magnitude of the grid potential relatively to the anode potential of the power grid-glow tubes.

The power grid-glow tubes 27 and 31 are essentially grid-controlled gaseous discharge tubes and comprise, respectively, anodes 28 and 32, cathodes 30 and 34, which are generally called the conducting electrodes, and grids 29 and 33, which are sometimes referred to as control electrodes. Inasmuch as power grid-glow tubes have the property of rectifying alternating current, I provide for utilizing two in order to give double-wave rectification. However, it will be readily understood that my invention is operable by using only one power grid-glow tube.

The power grid-glow tubes are preferably of the well known type wherein the cathode comprises a filament surrounded by an inert gas. The filament when electrically heated by a suitable source of current, such as the secondary transformer winding 17, liberates primary electrons which are necessary for the functioning of a power grid-glow tube. When a potential difference is applied between the anode and cathode, the anode being at a high potential, the liberated primary electrons move towards the anode. As these primary electrons acquire sufficient velocity, they collide with the molecules of the gas and produce both new electrons and positive ions. As the primary electrons, as well as the newly formed electrons, move towards the anode, they will have to pass the grid structure. The grid may be charged either to a positive or a negative potential and, therefore, helps to either accelerate or retard the movements of the passing electrons. Hence, the action of the grid is such as to control the value of the anode-cathode potential at which the gas becomes ionized, or at which an arc is formed for the passage of a current between the anode and the cathode. For convenience, and in accordance with the accepted engineering parlance, the potential of the grid will hereinafter be considered with reference to the potential of the anode. For a given anode potential, there is a definite critical grid potential at which ionization occurs, thus allowing the power grid-glow tube to pass current in the form of a glow discharge (see Figs. 2 and 3). If the potential of the grid is below this critical grid potential, no discharge occurs, and accordingly, substantially no current pases between the anode and the cathode. On the contrary, if the potential of the grid rises above the critical grid potential, even for a momentary period, a discharge immediately occurs and current of relatively large value passes between the anode and the cathode. After the discharge or arc has started, however, the grid is surrounded by a space charge which thereby prevents it from exercising any further control over the arc. Consequently, the grid of a grid-glow tube is effective only in either preventing, or initiating, an arc between the anode and the cathode, but is not effective in extinguishing or controlling the arc after it is once started. However, the grid can regain control and thus prevent the arc from starting again, if the flow of current between the anode and the cathode ceases momentarily thus allowing the gas to deionize. Therefore, by applying an alternating current voltage to the anode and the cathode, the grid has an opportunity of regaining control once each cycle and can delay the starting of an arc for as long a time during the cycle as the potential of the grid is below the critical grid potential.

For the control of grid-glow tubes, two fundamental methods, well known in the art, are available. In the first or "magnitude" method, the phase relation of the grid potential relative to the anode potential remains fixed, but the magnitude of the grid potential is varied relatively to the anode potential for controlling the current passing between the anode and the cathode. In the second or "phase-shifting" method, the magnitude of the grid potential remains substantially fixed relative to the anode potential, but the phase relation of the grid potential relative to the anode potential is shifted for controlling the current passing between the anode and the cathode.

In the practice of my invention, I prefer to employ the "phase-shifting" method. However, as the description advances, it will be seen that, although my method of control is primarily the "phase-shifting" method, it still partakes of the "magnitude" method, thus resulting in a combination of the two.

The bridge circuit 13 for shifting the phase and the magnitude of the grid potential relative to the anode potential comprises a capacitor 37, a control winding 38 having a slidably mounted magnetic core 39, both connected in series circuit relation with the secondary winding 16 of the transformer 9, and a grid resistor 35 connected between the mid-tap 15 of the secondary winding 16 and a junction point 19 of the capacitor 37 and the control winding 38. As illustrated, the grid resistor 35 has a mid-tap 36 and comprises two sections. The left-hand section is connected in parallel circuit relation with the grid 33 and the cathode 34 of the power grid-glow tube 31, and the right-hand section is connected in parallel circuit relation with the grid 29 and the cathode 30 of the power grid-glow tube 27. Hence, by reason of the fact that the grids of the power grid-glow tubes and their respective sections of the grid resistor 35 are connected in parallel circuit relation, the phase relation and magnitude of the grid potentials relative to the anode potentials change in accordance with variations of the phase relation and magnitude of their respective sections of the grid resistor 35 by the bridge phase-shifting circuit 13.

Consider Figs. 2 and 3, and 4 which represent by curves and vector diagram respectively, how the grid potential relative to the anode potential varies the amount of current passing between the anode and the cathode. Referring particularly to Figs. 2 and 3, the higher substantially sinusoidal wave or curve represents the anode potential and the lower sinusoidal wave or curve substantially represents the grid potential, and the concave-shaped curve represents the critical grid potential. So long as the grid potential is below the value of the critical grid potential, no arc between the anode and the cathode is formed for passing current. However, as soon as the value of the grid potential rises to, or above, the critical grid potential, ionization occurs, at the point where the grid potential curve intersects the critical grid potential curve and an arc is formed for passing current between the anode and the cathode for the remaining part of the half cycle. In Figs. 2 and 3, the shaded portions represent, respectively, the quantity of current passing between the anode and the cathode during each half cycle for the illustrated phase angle displacements. Hence, it is possible to vary the quantity of current passing between the anode and the cathode from a minimum to a maximum by merely shifting the phase of the grid potential relatively to the anode potential. Fig. 4 shows a vector diagram representing how the grid potential is shifted relative to the anode potential.

The vector KO represents the potential between the terminal 21 and the mid-tap 15 of the secondary transformer 16, and the vector ON represents the potential between the mid-tap 15 and the terminal 22 of the secondary transformer 16. Since the anodes 28 and 32 of the power grid-glow tubes are connected in circuit relation with the secondary transformer winding 18, the phase relation of the anode potential of the power grid-glow tubes is always in phase with the vectors KO and ON. The potential across the capacitor 37 is represented generally by the length of the vector KP. When the slidably mounted core 39 is totally removed from the control winding 38, the potential across the control winding 38, resulting from the reactance only, is represented by the length of the vector PR. The potential caused by the effective resistance of the control winding 38 is represented by the length of the vector RN, making the potential resulting from the total impedance of the control winding equal to the vector PN. Hence, the phase relation of the grid potential relative to the anode potential is represented by the angle PON, while the length of the vector OP represents the magnitude of the grid potential. Therefore, when the slidably mounted iron core 39 is totally retracted from the control winding 38, by means of the illustrated rack and pinion control knob 40, the phase relation between the grid potential and the anode potential is relatively small, with the result that the power grid-glow tubes pass current during substantially the entire half cycle, as represented generally by the shaded portion in Fig. 2.

As the slidably mounted magnetic core 39 is gradually moved into the control winding 38, the impedance thereof correspondingly increases, causing a shifting of the phase of the grid potential with respect to the anode potential. When the slidably mounted magnetic core 39 is fully inserted within the control winding 38, the potential, resulting from the reactance only, greatly increases, thus causing the grid vector OP to swing in a clockwise direction to OP'. Hence, the phase relation of the grid potential with respect to the anode potential is represented by the angle P'ON, while the magnitude of the grid potential is represented by the length of the vector OP'. In this position, the vector P'R' represents the potential of the control winding 38 caused by the reactance only. The potential resulting from the effective resistance of the winding 38, since it gradually increases as the slidably mounted core 39 is moved into the control winding 38 because of the increased iron losses, is represented by the vector R'N, making the total potential resulting from the impedance of the control winding 38 equal to the length of the vector NP'.

By sliding the magnetic core 39 in-and-out of the control winding 38, the quantity of current which the grid glow tubes pass varies from a minimum as represented in Fig. 3 to a maximum as represented in Fig. 2.

The dotted lines above the vectors KO and ON represent the magnitude and the phase relation of the grid potential during the other half cycle.

In starting the motor 10, assuming that the primary transformer winding 12 is energized by the supply conductors 51 and 52, the operator depresses the push button 44, which establishes a circuit for actuating the winding of the relay 43. This circuit may be traced from the midpoint of the asymmetric units 41 and 42, which is of a positive potential, through a conductor 55, the push buttons 44 and 45, conductor 59, the winding of the relay 43, and conductor 60 to the mid-tap 54 of the secondary transformer winding 18 which is of a negative potential with reference to the mid-point of the asymmetric units 41 and 42. The closing of the lower contacts of the relay 43, established a holding circuit through the conductors 61 and 62, for relay 43, although the push button 44 may be released. When the relay 43 is energized, current flows during the positive half of the cycle from the terminal 53 of the secondary transformer 18, through a conductor 63, the uppermost contacts of the relay 43, conductor 69, the anode and the cathode of the power grid-glow tube 31, conductor 67, the armature of the motor 10, and conductors 56 and 60 to the mid-tap 54 of the transformer winding 18.

During the positive half cycle, the power grid-glow tube 27 is inoperative because a grid-glow tube passes current only when both the anode and the grid are of a positive potential. On the next half or negative portion of the cycle, since the anode 28 is positive and the grid 29 is positive, the grid-glow tube 27 is operative and current flows from the terminal 55 of the secondary transformer 18 through conductors 46 and 68, the middle contacts of the relay 43, the anode 28 and the cathode 30 of the power grid-glow tube 27, conductor 67, the armature of the motor 10, and conductors 56 and 60 to the mid-tap 54. During the negative half cycle, the power grid-glow tube 31 is inoperative and passes no current because the potential of the anode 32 and the grid 33 are both negative. Therefore, by means of my improved bridge phase-shifting circuit 13, the speed of the motor may be varied from a minimum to a maximum, depending upon the quantity of current passed by the power grid-glow tubes.

In the embodiment of my control system, it is readily apparent that the starting and stopping of the motor 10 could be effected by energizing and deenergizing the primary of the transformer 9, in which case the relay 43 could be omitted. However, I have illustrated the relay 43 because the life of the power grid-glow tubes is materially extended when the hot cathodes are allowed to heat up before the anode potential is applied by closing the contacts of the relay 43. Although I have illustrated the slidably mounted magnetic core 39 operated by a rack and pinion control knob 40, it may readily be actuated by means of a foot treadle so that the operator may vary the speed by merely varying the relative positions of the foot. The control winding 38 may be economically manufactured because it comprises nothing more than a winding having a plurality of turns upon a spool of suitable size.

In Fig. 5, I illustrate a control circuit embodying substantially all of the parts of the control circuit in Fig. 1, and like reference characters represent like parts, together with ancillary circuits to automatically and gradually accelerate the motor 10 from rest to any predetermined selected speed. In this embodiment of the invention the effectiveness of the control winding 38 is changed by means of an ancillary winding 86 connected in closed circuit relation with a three-electrode vacuum tube 100 having a plate 101, a filament 103 heated from the extra transformer secondary winding 104, and a grid 102. For the purpose of providing an effective coupling between the ancillary winding 86 and control winding 38 an iron core 89 is provided. The potential across the control winding 38 may be varied from a minimum value to a maximum value by causing the three-electrode vacuum tube to vary the impedance of the closed circuit. As is well known in the art, if the grid 102 is charged sufficiently negative, the impedance of the vacuum tube 100 is relatively high, representing the open condition of the closed circuit, whereas, on the contrary, if the potential of the grid 102 is charged sufficiently positive, the impedance of the vacuum tube 100 is relatively low, representing closed circuit condition.

Although several systems are available for gradually varying the potential of the grid 102 relative to the filament 103, I prefer to utilze a capacitor 110, in combination with resistors 112, 113 and 117. The combination of the reactor 116, and the two capacitors 114 and 115, is employed as a filter for providing a substantially constant flow of unidirectional current. By means of the filtering action, smoother operation of the control system is obtained.

In starting the motor 10 shown in Fig. 5, the push-button 44 is closed first, which, in turn, energizes the relay 43 for connecting the power grid-glow tubes 27 and 31 in circuit relation with the armature of the motor 10 and the secondary winding 18. In the usual operation, the relay 43, generally, remains in the closed position for the entire working day or for the performance of a particular piece of work.

After the power grid-glow tubes 27 and 31 are connected in circuit relation with the armature 10 and the secondary winding 18, the operator next operates the push button 119, which establishes a circuit for energizing the relay 105. This circuit may be traced from the positively energized conductor 55, through the push buttons 119 and 120, conductor 131, the winding of the relay 105, conductor 132, contacts of the relay 43, and conductor 133 to the negatively energized conductor 134. By reason of the fact that this circuit is carried through the contacts of the relay 43, it is necessary that the relay 43 be closed before the relay 105 can be energized. However, before the operator operates the push-button 119, it will be observed that the condenser 110 is shunted and that the potential of the grid 102 of the vacuum tube 100 is therefore charged negatively with respect to the cathode 103. The circuit for charging the grid 102 at a negative potential may be traced from the negatively energized conductor 134 through the right-hand portion of the adjustable resistor 117, conductor 138, the reactor 116, the contacts of the relay 118, conductor 139, the lowermost contacts 109 of the relay 105, conductor 139 to the grid 102. The cathode 103 of the vacuum tube 100 is always maintained at a positive potential because the conductor 122 that leads to the cathode 103 is connected to the positively energized conductor 55. Therefore, before the start push-button 119 is depressed, by reason of the fact that the grid 102 is charged negatively with respect to the cathode, the effective impedance of the vacuum tube 100 is relatively high, representing substantially an open circuit condition of the closed winding that comprises the ancillary winding 86. This means that the potential across the control winding 38 is a maximum, with the result that the power grid-glow tubes 27 and 31 pass insufficient current to cause the motor 10 to run.

Just as soon as the push button 119 is depressed, the shunt across the condenser 110 is removed and, as a result, the condenser gradually builds up to a potential as determined by the setting of the adjustable resistor 113. The charging circuit for the condenser 110 may be traced from the negatively energized conductor 134, through the right-hand portion of the adjustable resistor 117, the conductor 138, the reactor 116, the contacts of the relay 118, conductor 139, the condenser 110, the adjustable resistor 111, conductor 140, the contact 107 of the relay 105, conductor 141, the lower portion of the adjustable resistor 113 to the positively energized conductor 55. The condenser gradually builds up, at the same time, causing the potential of the grid 102 to change from a negative value to a positive value. This means that the effective impedance of the vacuum tube 100 is, accordingly, changed and gradually varies the impedance of the control winding 38. By the gradual change of the impedance of the control winding 38, the power grid-glow tubes pass an increasing amount of current from a minimum value to a maximum value, thereby accelerating the motor from rest to any predetermined selected speed. By varying the settings of the adjustable rheostat 113, the potential, at which the condenser becomes charged, may be varied. That is to say, as the settings of the adjustable resistor 113 is moved towards the positively energized conductor 55, the potential of the condenser gradually approaches the potential of the positively energized conductor. Therefore, by varying the setting of the adjustable rheostat 113, the speed of the motor may be set at any predetermined selected value. Also, by means of the adjustable resistor 111, the rate at which the condenser builds up, may be varied, and, hence, the operator is able to vary the rate of acceleration of the motor.

In some applications, particularly in those wherein the motor is connected to a high inertia load, it is preferable when starting the load to momentarily over-energize the motor, thus producing a very large torque. This feature may be accomplished by the operator momentarily depressing the push button 121 prior to depressing the push button 119. By depressing the push button 121, current flows from the positively energized conductor 55 through conductor 162, push button 121, conductor 143, the winding of the relay 118 to the negatively energized conductor 134. The opening of the contacts of the relay 118 disconnects the capacitor 110 from the grid circuit of the vacuum tube 120 and directly connects the grid 102 in circuit relation with the adjustable resistor 112 through the contacts 108 of the relay 105. This momentarily biases the potential of the grid 102 of the vacuum tube 100 to a potential determined by the setting of the adjustable resistor 112. The nearer the setting of the adjustable resistor 112 approaches the positively energized conductor 55, the closer the potential of the grid 102 approaches the potential of the cathode 103. Therefore, the impedance of the control winding 38 is momentarily decreased to a minimum value for causing the power grid-glow tubes to momentarily pass a relatively large quantity of current to the motor 10 for producing a very high starting torque to overcome the high inertia load to which the motor is connected. After the motor has once set the high inertia load in rotation, the operator removes his finger from the push button 121 and depresses the start button 119, and the motor gradually accelerates to the predetermined selected speed value as determined by the setting of the adjustable resistor 113.

Fig. 6, a modified form of my invention, shows a means for varying the impedance of the control winding 38 in accordance with the tension of material being wound upon a reel. The motor 10 and the control winding 38 of Fig. 6 are the same as those shown in Fig. 1. The remaining control circuit of Fig. 6 is not shown because it is exactly the same as the control circuit of Fig. 1. As illustrated, in Fig. 6, the reel 80 is driven by the motor 10 and is withdrawing material from the supply reel 81. By means of the two stationary guide rollers 82 and 83 and the movable guide roller 84, the magnetic core 85 of the control winding 38 may be moved in accordance with the tension of the material being wound. If the tension increases, the magnetic core is raised into the control winding 38, with the result that the quantity of current passing through the power grid-glow tubes 27 and 31 is decreased for lowering the speed of the motor. On the contrary, if the tension of the material becomes less than a predetermined value, the magnetic core is lower and the quantity of current passing through the power grid-glow tubes is increased for increasing the speed of the motor 10. By means of this arrangement, the tension at which the material is being wound is maintained at a substantially constant value.

Associated with the control winding 38 of Fig. 6, I employ an ancillary winding 86 connected in closed circuit with an adjustable resistor 87. This closed circuit is comparable to the closed circuit shown in Fig. 5, but the push button 88 and the adjustable resistor 87 replace the action of the vacuum tube 100. The closed circuit is designed to give a very large starting torque for starting the motor 10 when it is connected to high inertia load. By merely depressing the push button 88, the impedance of the control winding 38 is greatly lowered, which, in turn, causes the power grid-glow tubes to pass a substantially maximum quantity of current for causing the motor 10 to develop a high starting torque. The value of the high starting torque may be adjusted by varying the settings of the adjustable resistor 87.

Although I have illustrated my invention with power grid-glow tubes wherein the cathode is a filament, it is to be understood that power grid-glow tubes of other types may be utilized, such for example as, the equally well known tubes employing a mercury pool for the cathode. The critical grid potential characteristics of this last-named tube are somewhat different from those given by the characteristic curves in Figs. 2 and 3, but the results accomplished by using either type of tubes may be substantially the same.

Therefore, my control system, with its modified forms, provides for controlling a motor to meet any desirable operating conditions for which the motor may be utilized.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

A motor starting control system comprising, in combination, an electric motor driving a load, means for energizing the motor, an electric discharge device for controlling the energization of the motor, a bridging circuit for regulating the electric discharge device, said bridging circuit including a transformer winding having a mid-tap, a capacitor, a control winding having a slidably mounted magnetic core all connected in series circuit relation, and a grid resistor connected between the mid-tap of the transformer winding and a junction point of the capacitor and the control winding, and means responsive to the load on the motor for actuating the slidably mounted magnetic core, an ancillary winding inductively related to the control winding, an adjustable resistor, and means for connecting the ancillary winding and the adjustable resistor in closed circuit relation.

JOSEPH F. KOVALSKY.